US010630934B2

(12) United States Patent
Arana

(10) Patent No.: US 10,630,934 B2
(45) Date of Patent: Apr. 21, 2020

(54) HIGH DYNAMIC RANGE ENHANCEMENT AUTHORIZATION

(71) Applicant: Disney Enterprises, Inc., Burbank, CA (US)

(72) Inventor: Mark Arana, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/838,267

(22) Filed: Dec. 11, 2017

(65) Prior Publication Data

US 2019/0182448 A1 Jun. 13, 2019

(51) Int. Cl.
*H04N 5/92* (2006.01)
*H04N 5/93* (2006.01)
*H04N 5/76* (2006.01)
*H04N 9/82* (2006.01)
H04N 9/70 (2006.01)
H04N 9/30 (2006.01)

(52) U.S. Cl.
CPC ............. *H04N 5/76* (2013.01); *H04N 9/8205* (2013.01)

(58) Field of Classification Search
USPC ......................... 386/326, 353, 300, 239, 248
See application file for complete search history.

(56) References Cited

U.S. PATENT DOCUMENTS 8,818,169 B2  8/2014 Stewart et al.
8,955,754 B2  2/2015 Atkinson et al.
2012/0217304 A1  8/2012 Atkinson
2015/0245096 A1* 8/2015 Mertens ............. H04N 21/2541
                                                      725/31
2015/0304296 A1 10/2015 Brown et al.
2016/0027160 A1* 1/2016 Aydin ....................... G06T 5/40
                                                       382/162
2016/0163356 A1  6/2016 De Haan et al.
2017/0104973 A1  4/2017 Toma et al.
2017/0163950 A1  6/2017 Uchimura et al.
2019/0141337 A1* 5/2019 Li ......................... H04N 19/147

OTHER PUBLICATIONS

BD-J, Wikipedia, pp. 1-5, retrieved at https://en.wikipedia.org/wiki/BD-J on Jun. 12, 2017.

(Continued)

*Primary Examiner* — Daquan Zhao
(74) *Attorney, Agent, or Firm* — Farjami & Farjami LLP

(57) ABSTRACT

Systems and methods for selectively enabling enhanced high dynamic range (HDR) metadata for enhanced HDR playback of media content stored on a media disc are provided. Media discs may be authored with a base layer media content in accordance with a non-enhanced HDR media profile. Media discs may also include enhanced HDR metadata. In order to enable the use of the enhanced HDR metadata, a media player in which the media disc is inserted for playback may first seek authorization from a third-party resource, such as an authorization server. Only after obtaining authorization is the media player allowed to playback the media content stored on the media disc in conjunction with the enhanced HDR metadata. If authorization is not obtained, the media player may only play the base layer media content.

15 Claims, 4 Drawing Sheets

(56) References Cited

OTHER PUBLICATIONS

Silva, First Wave of True Ultra HD Blu-ray Discs Announced, Lifewire, Oct. 24, 2016, pp. 1-8, retrieved at https://www.lifewire.com/true-ultra-hd-blu-ray-discs-1847066 on Jun. 12, 2017.
Welch, Vizio rolls out HDR10 support for SmartCast P-Series and M-Series 4K TVs, The Verge, Aug. 10, 2016, pp. 1-3, retrieved at https://www.theverge.com/circuitbreaker/2016/8/10/12423536/vizio-hdr10-smartcast-update-now-available on Jun. 12, 2017.
Archer, Sony Pictures Names and Dates Its First Dolby Vision Ultra HD Blu-ray, Forbes, May 2, 2017, pp. 1-4, retrieved at https://www.forbes.com/sites/johnarcher/2017/05/02/sony-pictures-names-and-dates-its-first-dolby-vision-ultra-hd-blu-ray/#6260eba62b05 on Jun. 12, 2017.

* cited by examiner

HIGH DYNAMIC RANGE ENHANCEMENT AUTHORIZATION

TECHNICAL FIELD

The present disclosure relates generally to remote authorization for enabling high dynamic range metadata.

DESCRIPTION OF THE RELATED ART

Dynamic range can refer to a ratio between the largest and smallest values that a certain quantity can assume. In the context of photography or video, dynamic range can refer to the range of values representative of a gradient between the whitest whites and the blackest blacks or the lowest and highest values of density and luminance in an image or frame. A goal in photography or video is to extend the range of tones between the maximum and minimum values to create a "fuller" look. Accordingly, high dynamic range (HDR) video can be video that has a greater dynamic range than that of standard dynamic range (SDR) video which, for example, uses a conventional gamma curve. Thus, HDR video produces images that have higher contrast and expanded color ranges that combine to provide more refined details.

BRIEF SUMMARY OF THE DISCLOSURE

In accordance with one embodiment, a computer-implemented method comprises determining at least one of a title of a media disc and media player identification data regarding a media player in which the media disc is inserted. The computer-implemented method may further comprise generating an enhancement metadata authorization request including at least one of the title and the media player identification data, and transmitting the enhancement metadata authorization request to an authorization server. Further still, the computer-implemented method may comprise receiving a response including an enhancement metadata authorization decision. Depending on the enhancement metadata authorization decision, a base layer media content stored on the media disc is played or the base layer media content in conjunction with the enhancement metadata is played.

In some embodiments, the title identifies primary media content stored on the media disc. In some embodiments, the base layer media content comprises media content authored in accordance with a non-enhanced high dynamic range (HDR) media profile. In some embodiments, the enhancement metadata comprises enhanced HDR metadata. In some embodiments, the enhanced HDR metadata comprises at least one of metadata including one or more settings rendering the base layer media content in accordance with an enhanced HDR media profile.

In some embodiments, the enhancement metadata authorization decision comprises a decision to authorize enablement of the enhanced metadata to allow playing of the base layer media content in conjunction with the enhancement metadata. In some embodiments, the enhancement metadata authorization decision comprises a decision to authorize enablement of the enhanced metadata to allow playing of the base layer media content in conjunction with the enhancement metadata. Moreover, the enhancement metadata authorization decision comprises a decision to authorize enablement of enhanced metadata associated with one or more other titles associated with one or more other media discs subsequently inserted into the media player.

In some embodiments, the computer-implemented method further comprises storing the one or more other titles in a memory of the media player.

In some embodiments, the computer-implemented method further comprises determining whether enablement of the enhanced metadata associated with the one or more other titles is authorized by checking the memory of the media player. If the authorization is not determined by checking the memory of the media player, another enhancement metadata authorization request is transmitted to the authorization server.

In accordance with one embodiment, a computer-implemented method comprises receiving an enhancement metadata authorization request. The enhancement metadata authorization request can be parsed, at least one of a disc title and media player identification data from the enhancement metadata authorization request can be determined. Further still, the computer-implemented method may comprises determining whether the at least one of the disc title and the media player identification data is authorized for playback of media content in conjunction with enhancement metadata stored on a media disc identified by the disc title. A response based on the determination can be generated. The response can be transmitted to a media player from which the enhancement metadata authorization request was received.

In some embodiments, the disc title identifies the media content stored on the media disc. In some embodiments, the media content comprises base layer media content authored in accordance with a non-enhanced high dynamic range (HDR) media profile.

In some embodiments, the enhancement metadata comprises enhanced HDR metadata. In some embodiments, the enhanced HDR metadata comprises at least one of metadata including one or more settings rendering the base layer media content in accordance with an enhanced HDR media profile. In some embodiments, the response comprises an authorization for enablement of the enhanced metadata to allow playing of the base layer media content in conjunction with the enhancement metadata. In some embodiments, the response comprises an authorization for enablement of enhanced metadata associated with at least one of one or more other disc titles associated with one or more other media discs and one or more subsequent firmware versions associated with the media player.

In some embodiments, the computer-implemented method further comprises determining whether enablement of the enhanced metadata associated with the one or more other titles is authorized by checking the memory of the media player. If the authorization is not determined by checking the memory of the media player, another enhancement metadata authorization request is transmitted to the authorization server.

In accordance with one embodiment, an apparatus comprises a processor, and a memory unit operatively connection to the processor. The memory unit includes computer code configured to cause the processor to determine at least one of a title of a media disc and media player identification data regarding a media player in which the media disc is inserted. The memory unit further includes computer code configured to cause the processor to generate an enhancement metadata authorization request including at least one of the title and the media player identification data. Further still, the memory unit includes computer code configured to cause the processor to: transmit the enhancement metadata authorization request to an authorization server; receive a response including an enhancement metadata authorization decision; and depending on the enhancement metadata authorization decision, play only a base layer media content stored on the media disc or playing the base layer media content in conjunction with the enhancement metadata.

In accordance with some embodiments, the base layer media content is authored in accordance with a non-enhanced high dynamic range (HDR) media profile. In some embodiments, the enhanced metadata comprises at least one of metadata including one or more settings rendering the base layer media content in accordance with an enhanced HDR media profile.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Content stored on physical media, such as Ultra High Definition (UHD) Blu-ray optical disc can be authored using HDR content, e.g., content created and formatted in accordance with an HDR10 Media Profile (as defined by the Consumer Technology Association). The HDR10 Media Profile uses the Society of Motion Picture and Television Engineers (SMPTE) 2084 Perceptual Quantizer (PQ) transfer function. Conventional HDR, such as HDR10, may be described as being "static." That is, HDR metadata can be used to establish pictures settings at the beginning of the content, e.g., a movie, TV show, etc. which are then used consistently throughout playback to render HDR content. In particular, HDR metadata can be inserted into the content, where the HDR metadata includes information regarding, for example, gamma electrical optical transfer function, peak and minimum luminance value, dynamic range indication, SDR, color or bit depth. The HDR metadata can be parsed/extracted to retrieve those settings according to which, the content may be played back so long as the device, e.g., media player and/or display are capable of handling those settings. It should be noted that the aforementioned types of information are merely examples, and other information may be included in HDR metadata.

In recent years, advancements in HDR technology have resulted in enhanced versions of HDR10. Examples of these enhanced media profiles include, but are not limited to the Dolby Vision and Samsung's HDR10+. These enhanced products improve on HDR10 by using "dynamic" metadata instead of static metadata, e.g., as defined by SMPTE 2096, for example. In particular, individual scenes or frames of a movie, TV show, etc. can be altered in accordance with desired HDR settings in real-time. However, not all media players and/or displays are capable of rendering content according to these enhanced HDR media profiles.

Figure 1A:
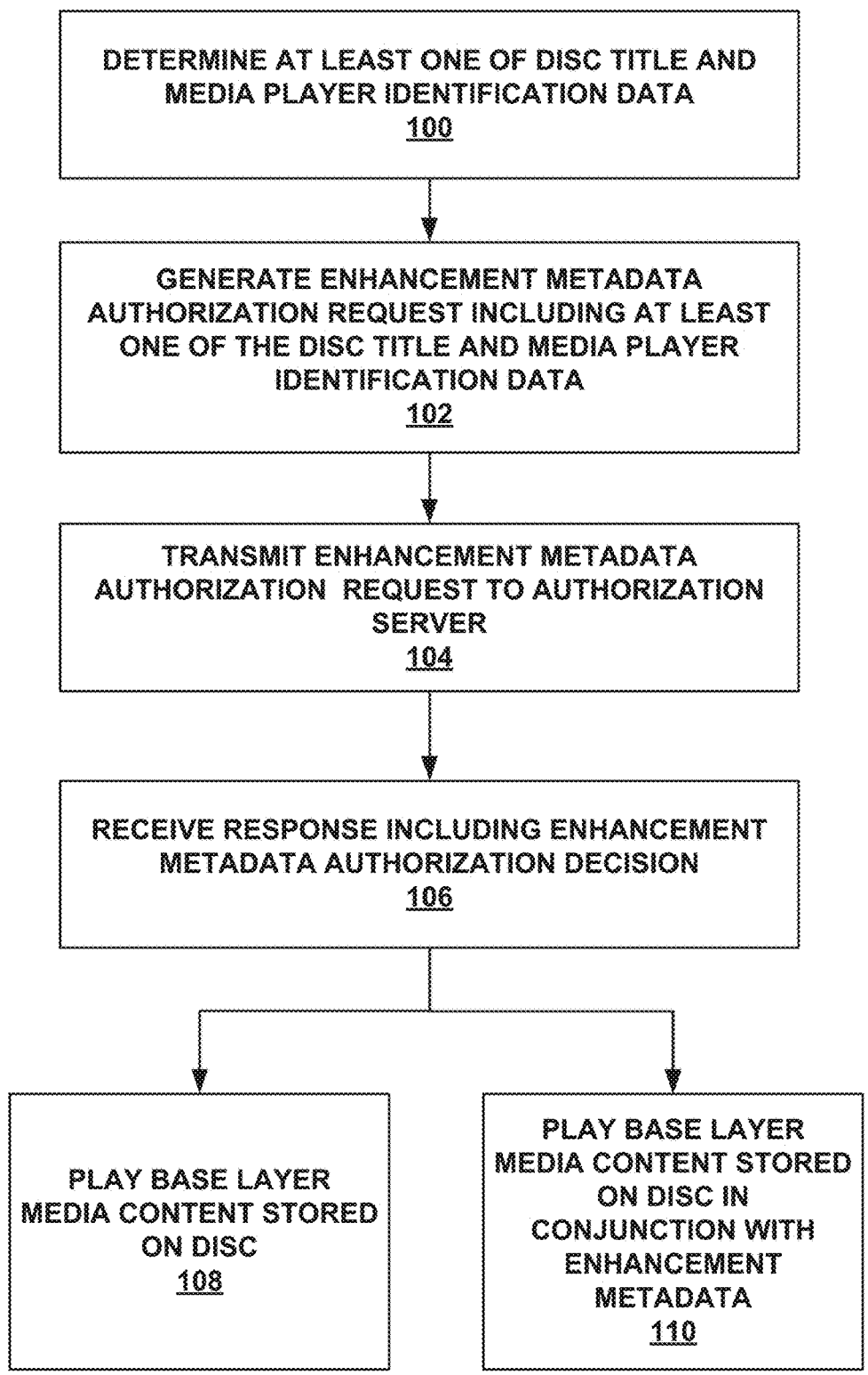
FIG. 1A is a flow chart illustrating example operations that can be performed to request and receive remote authorization of enhancement layer metadata in accordance with one embodiment.
Figure 1B:
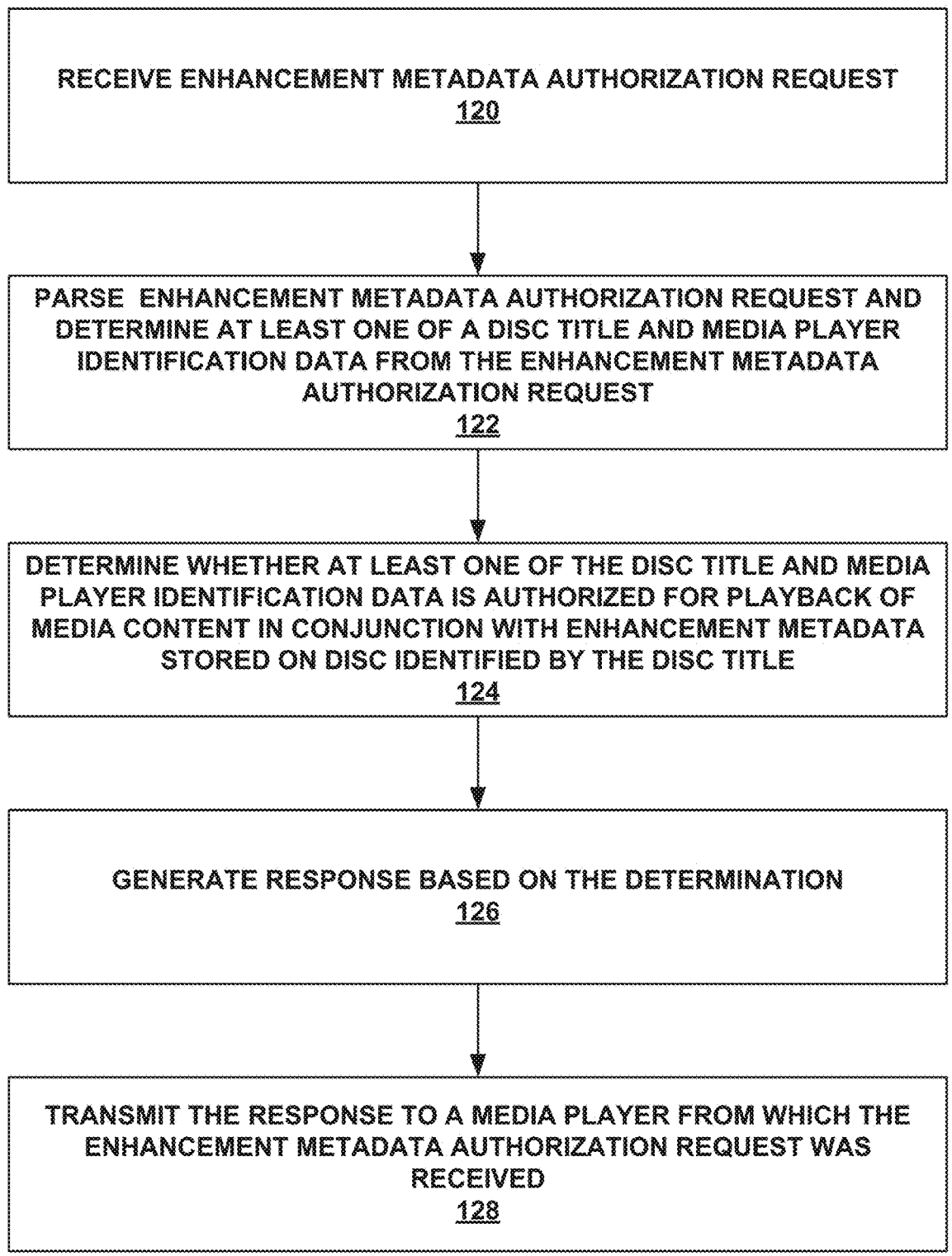
FIG. 1B is a flow chart illustrating example operations that can be performed to remotely authorize enhancement layer metadata enablement in accordance with one embodiment.

Accordingly, various embodiments are directed to systems and methods of authorizing the use of enhanced HDR metadata. FIGS. 1A and 1B illustrate example operations that may be performed in order to authorize or enable the use of settings set forth in enhanced HDR metadata in accordance with one embodiment. FIGS. 1A and 1B will be described in conjunction with FIG. 2, an example system in which various embodiments may be implemented.

At operation 100, at least one of a disc title and media player identification data may be determined. In some embodiments, authorizing the use of enhanced HDR metadata may depend on whether or not a content provider wishes to enable the rendering of content in accordance with enhanced HDR metadata. That determination can be made based on the particular content stored on a media disc which can be identified by the disc title.

For example, a content provider may wish to hold back or otherwise control enablement of enhanced HDR metadata in association with certain content or particular titles, e.g., movie titles, TV shows, etc. Accordingly, a "base" content layer can be created and stored along with enhanced HDR metadata regarding luminance and chrominance settings that are commensurate with the enhanced HDR media profile. In this way, the base content layer may be rendered "as is," i.e., according to the non-enhanced HDR10 Media Profile, or rendered in accordance with the enhanced HDR metadata. A content provider, such as a studio, may distribute enhanced HDR titles, e.g., movies, TV shows, etc. on media discs. In order to render the content using the enhanced HDR metadata, authorization can be requested and received.

Figure 2:
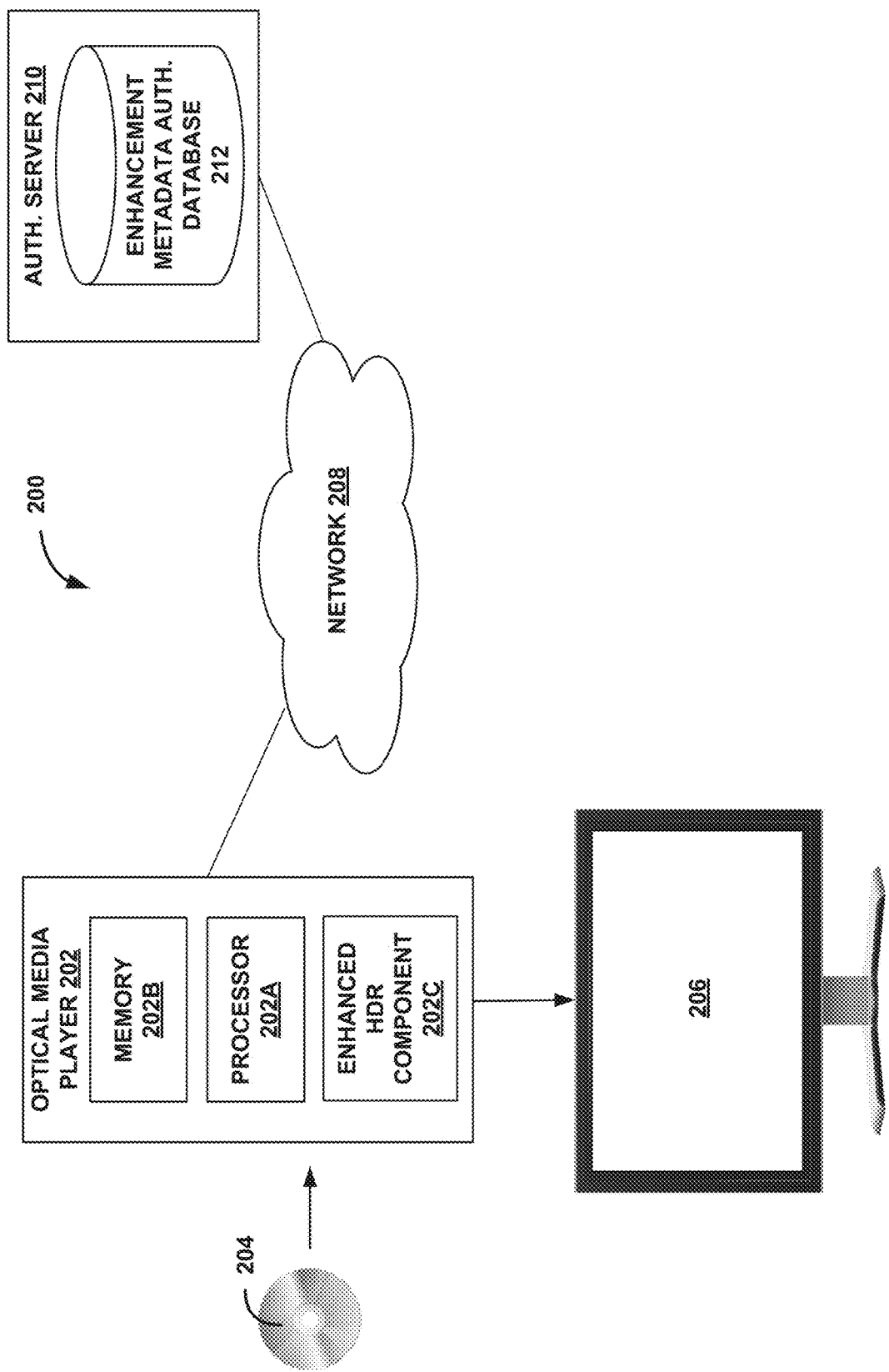
FIG. 2 illustrates an example environment in which various embodiments may be implemented.

Referring to FIG. 2, an example system 200 is illustrated, where the system 200 may include an optical media player 202, such as a UHD Blu-ray player, which in turn may comprise a processor 202A and a memory unit 202B. Optical media player 202 may further comprise an enhanced HDR component 202C for rendering media content in accordance with enhanced HDR metadata. In some embodiments, a media player may be communicatively connected to an authorization server 210. The authorization server 210 may be controlled and/or maintained by a content provider, such as a studio that distributes titles via media discs, e.g., UHD Blu-ray media disc on which content may be stored. In some embodiments, authorization server 210 may be controlled by a third-party, such as an online information resource entity.

As used herein, the term content provider may be any party or entity that creates and/or distributes content via media disc. Accordingly, a content provider may be a studio, such as a movie studio, or a third-party content creator or distributor, such as Netflix®.

Upon insertion of a media disc, e.g., media disc 204, into optical media player 202, optical media player 202 may determine the disc title associated with media disc 204 by reading a certain track(s) of media disc 204.

In some embodiments, a content provider may require that certain hardware, firmware, and/or software be used to render enhanced HDR content. For example, due to the relatively recent development of enhanced HDR media profiles, media players and displays may, at times, have difficulty or experience issues rendering enhanced HDR content. Accordingly, content providers may wish to control enablement of that enhanced HDR metadata based upon one or more characteristics of a media player used to play a media disc. Thus, in some embodiments, media player identification data may also be a basis for authorizing the enablement of enhanced HDR metadata. Media player identification data can include, but is not limited to any one or more of brand, model number, and firmware version. Media player identification data may be obtained from a media player's local memory, e.g., memory unit 202B of optical media player 202.

At operation 102, an enhancement metadata authorization request may be generated, the request including at least one of the disc title and player identification data.

At operation 104, the enhancement metadata authorization request may be transmitted to an authorization server. For example, optical media player 202 may communicate the disc title information and/or information indicative of its brand, model, and/or firmware version to authorization server 210 over a network 208.

Network 208 may be any communications network such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. Accordingly, network 208 may employ various communication media, such as a coaxial cable, fiber optic cable system, Ethernet, radio waves, etc.

Authorization server 210 may access one or more enhancement metadata authorization databases, an example of which is enhancement metadata authorization database 212. Enhancement metadata authorization database 212 may be a database or other datastore on which a lookup table or list of titles and/or media player identifiers for which the studio has authorized enablement of the enhanced HDR metadata is stored. Depending on whether the disc title and/or media player identification data transmitted in the enhancement metadata authorization request is found in enhancement metadata authorization database 212, authorization server 210 sends a response back to media player 202. Thus, at operation 106, a response including an enhancement metadata authorization decision may be received, e.g., by media player 202. The response may comprise a unique authorization code that enables the enhancement layer. It should be noted that authorization may also be entered, e.g., manually, in a debug menu or user menu. Authorization codes may be delivered, in some embodiments, by text message, social media messaging, a public post, etc.

Depending on the response, only base layer media content stored on a media disc may be played at operation 108. For example, if the content provider has not authorized enablement of enhanced HDR metadata encoded on the media disc and/or the media player brand/model/firmware version is not authorized, optical media player 202 may only play the base media content (without the enhanced HDR metadata). If the content provider has authorized enablement of enhanced HDR metadata for a particular disc title and/or particular media player, the base layer media content may be played in conjunction with the enhancement metadata at operation 110. In particular, the base layer media content may be decoded, e.g., by a standard High Efficiency Video Coding (HEVC) decoder in optical media player 202, and then post-processed using enhanced HDR component 202C in accordance with the enhanced HDR metadata to produce a full range enhanced HDR media content signal for playback. It should be noted that if a response is not received, a determined default action can take place, be performed, e.g., playing the base layer media content.

In some embodiments, a configuration file embedded or implemented in memory unit 202B of optical media player 202 may instruct processor 202A to determine the disc title of media disc 204 and/or retrieve media player identification data associated with optical media player 202. Moreover, it should be noted that the configuration file is programmed such that playback of a base layer media content is the default. As described herein, in order to enable enhancement HDR metadata, processor 202A of media player 202 must first determine whether or not the disc title and/or whether media player 202 is authorized to utilize enhanced HDR metadata, if present on media disc 204. The configuration file may also control generation of and transmission of the enhancement metadata authorization request, and may control operation of optical media player 202 in accordance with the response containing the enhancement metadata authorization decision.

FIG. 1B is a flow chart illustrating example operations that may be performed to authorize enablement of enhanced HDR metadata in accordance with various embodiments. While FIG. 1A illustrates example operations performed at the user or media player-side, FIG. 1B illustrates example operations that may be performed on the authorization server side.

At operation 120, an enhancement metadata authorization request may be received by an authorization server. Referring to FIG. 2, as previously described, optical media player 202 may generate the enhancement metadata authorization request based on a disc title and/or media player identification data, and transmit the enhancement metadata authorization request to authorization server 210.

At operation 122, the enhancement metadata authorization request may be parsed and at least one of a disc title and media player identification data may be determined. At operation 124, a determination may be made regarding whether at least one of the disc title and media player identification data is authorized for playback of media content in conjunction with enhancement metadata stored on the media disc identified by the disc title. For example, enhanced HDR component 202C may determine that enhanced HDR metadata is encoded onto media disc 204 upon insertion into optical media player 202. Enhanced HDR component 202C may instruct optical media player 202 to communicate with authorization server 210 to determine if at least one of the disc title identifying media disc 204 and the brand, model, and/or firmware version of optical media player 202 is authorized for enhanced HDR playback of the media content. As described above, this determination can be made by comparing the disc title and/or media player identification data with that stored in enhancement metadata authorization database 212.

At operation 126, based on the authorization determination, a response can be generated by authorization server 210. At operation 128, the response can be transmitted back to the media player from which the enhancement metadata authorization request was received, for example, optical media player 202.

It should be noted that more than one set of metadata can be encoded onto a media disc. For example, as noted previously, different enhanced HDR products have been developed, e.g., Dolby Vision and HDR10+. A media disc, such as media disc 204 may be encoded with multiple sets of enhanced HDR metadata. The enhancement metadata authorization database 212 may contain information regarding which one of the multiple sets of enhanced HDR metadata is authorized for use by optical media player 202. For example, a content provider or creator may prefer the use of a particular enhanced HDR media profile in a particular media player brand or model or a particular media player operating in accordance with a particular firmware version.

In some embodiments, the lookup table, list, or datastore maintained in enhancement metadata authorization database 212 may include links or reflect relationships between disc titles and/or media player identification data, such that an authorization determination and response can apply to multiple disc titles and/or sets of media player identification data. For example, upon receipt of an enhancement metadata authorization request comprising information regarding a particular disc title and/or a particular firmware version utilized by optical media player 202, authorization server 210 may respond with a list or set of additional disc titles and/or media player identification data that are authorized for enhanced HDR playback. This list or set of information may be stored by optical media player 202 in memory unit 202B.

Upon a subsequent use of optical media player 202 (e.g., insertion of another media disc into optical media player 202), enhanced HDR component 202C may first determine whether the disc title and/or media player identification data can be found in memory unit 202B. If so, enhanced HDR component 202C can instruct processor 202A to enable the appropriate enhanced HDR metadata. If not, enhanced HDR component 202C can, in some embodiments, play the base layer media content. In accordance with other embodiments, enhanced HDR component 202C can instruct optical media player 202 to transmit an enhancement metadata authorization request to authorization server 210 to determine if enhanced HDR metadata can be enabled for that instance. In this way, optical media player 202 need not always seek authorization from authorization server 210, reducing the use of communication resources, cost, network traffic, etc. Moreover, a content provider or distributor may be able to use a single disc title to authorize enablement of enhanced HDR metadata associated with multiple disc titles. Additionally, a content provider or distributor may be able to authorize subsequent firmware versions by transmitting a response/decision that any later firmware versions of a current firmware version are authorized to use the enhanced HDR metadata.

It should be noted that the authorization process described herein requires no input from a user. That is, a user need not enter any identification information or otherwise participate in the authorization process, other than inserting a media disc into a media player. However, in some embodiments, enhanced HDR component 202C or processor 202A of optical media player 202 may employ one or more security checks to prevent tampering with the enhancement metadata authorization request or disc title/media player identification data. In this way, a user may not illegitimately enable enhanced HDR metadata. For example, the enhancement metadata authorization request may be encrypted upon generation or may be transmitted with a key or other code.

It should be noted that media content in the present disclosure can be any type of content, including but not limited to movies, broadcast TV shows, online videos, user-created videos/content, music, images, sports games, video games, and the like. It should also be noted that although various embodiments disclosed herein are described in the context of enhanced HDR content and/or metadata, the various embodiments can be adapted for use in other contexts, such as for enabling other visual formats, features, and the like.

Figure 3:
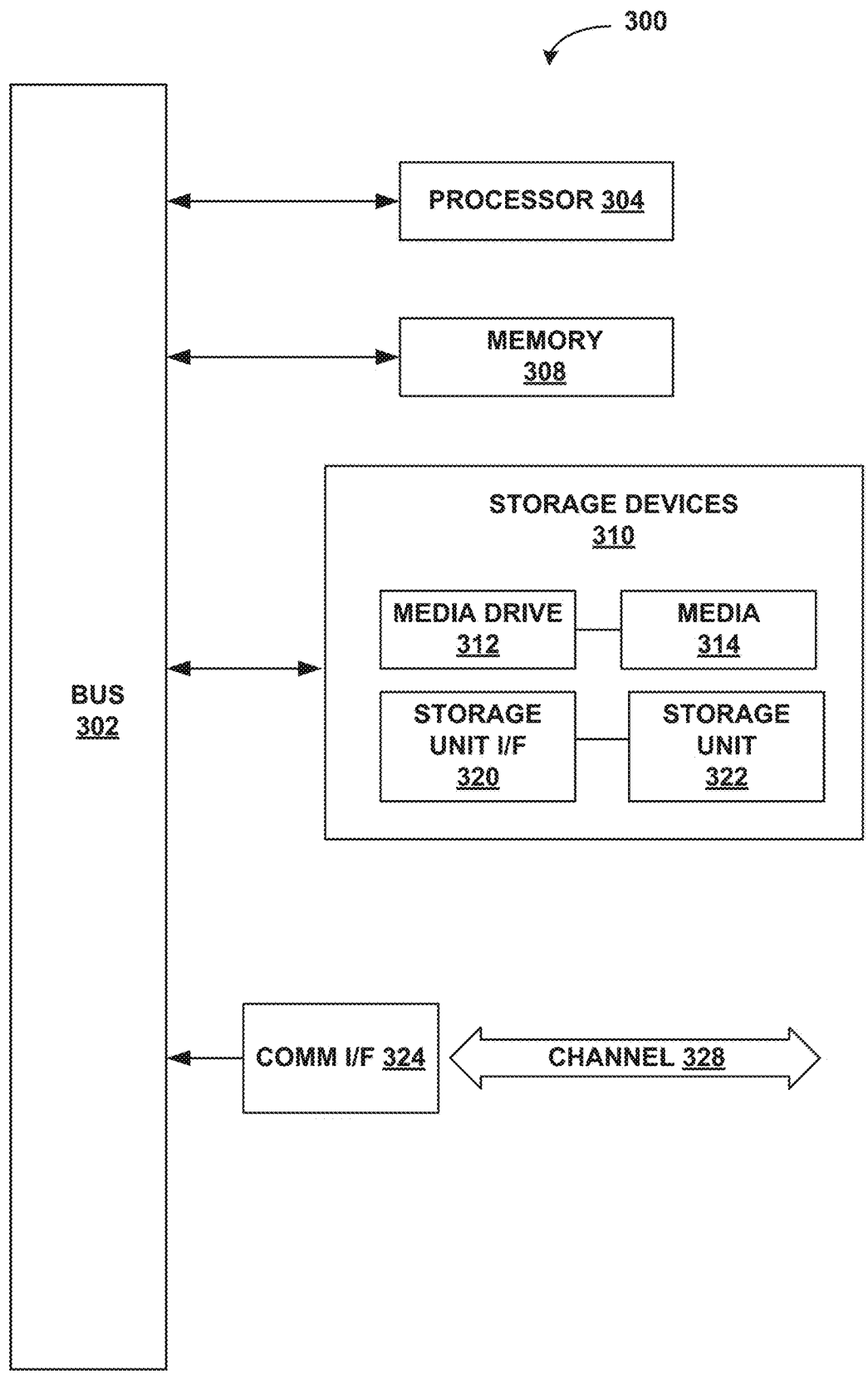
FIG. 3 is an example computing component that may be used to implement various features of embodiments described in the present disclosure.

FIG. 3 illustrates an example computing component that may be used to implement various features of the system and methods disclosed herein, such as the aforementioned features and functionality of one or more features of media player 202 and authorization server 210.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components or components of the application are implemented in whole or in part using software, in one embodiment, these software elements can be implemented to operate with a computing or processing component capable of carrying out the functionality described with respect thereto. One such example computing component is shown in FIG. 3. Various embodiments are described in terms of this example-computing component 300. After reading this description, it will become apparent to a person skilled in the relevant art how to implement the application using other computing components or architectures.

Referring now to FIG. 3, computing component 300 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 300 might also represent computing capabilities embedded within or otherwise available to a given device. For example, a computing component might be found in other electronic devices such as, for example navigation systems, portable computing devices, and other electronic devices that might include some form of processing capability.

Computing component 300 might include, for example, one or more processors, controllers, control components, or other processing devices, such as a processor 304. Processor 304 might be implemented using a general-purpose or special-purpose processing engine such as, for example, a microprocessor, controller, or other control logic. In the illustrated example, processor 304 is connected to a bus 302, although any communication medium can be used to facilitate interaction with other components of computing component 300 or to communicate externally.

Computing component 300 might also include one or more memory components, simply referred to herein as main memory 308. For example, preferably random access memory (RAM) or other dynamic memory, might be used for storing information and instructions to be executed by processor 304. Main memory 308 might also be used for storing temporary variables or other intermediate information during execution of instructions to be executed by processor 304. Computing component 300 might likewise include a read only memory ("ROM") or other static storage device coupled to bus 302 for storing static information and instructions for processor 304.

The computing component 300 might also include one or more various forms of information storage mechanism 310, which might include, for example, a media drive 312 and a storage unit interface 320. The media drive 312 might include a drive or other mechanism to support fixed or removable storage media 314. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 314 might include, for example, a hard disk, an integrated circuit assembly, magnetic tape, cartridge, optical disk, a CD or DVD, or other fixed or removable medium that is read by, written to or accessed by media drive 312. As these examples illustrate, the storage media 314 can include a computer usable storage medium having stored therein computer software or data.

In alternative embodiments, information storage mechanism 310 might include other similar instrumentalities for allowing computer programs or other instructions or data to be loaded into computing component 300. Such instrumentalities might include, for example, a fixed or removable storage unit 322 and an interface 320. Examples of such storage units 322 and interfaces 320 can include a program cartridge and cartridge interface, a removable memory (for example, a flash memory or other removable memory component) and memory slot, a PCMCIA slot and card, and other fixed or removable storage units 322 and interfaces 320 that allow software and data to be transferred from the storage unit 322 to computing component 300.

Computing component 300 might also include a communications interface 324. Communications interface 324 might be used to allow software and data to be transferred between computing component 300 and external devices. Examples of communications interface 324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 324 might typically be carried on signals, which can be electronic, electromagnetic (which includes optical) or other signals capable of being exchanged by a given communications interface 324. These signals might be provided to communications interface 324 via a channel 328. This channel 328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 308, storage unit 320, media 314, and channel 328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 300 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
    determining at least one of a title of a media disc or media player identification data regarding a media player in which the media disc is inserted;
    generating an enhancement metadata authorization request including the at least one of the title or the media player identification data;
    transmitting the enhancement metadata authorization request to an authorization server;
    receiving a response including an enhancement metadata authorization decision; and
    playing base layer media content in conjunction with enhanced high dynamic range (HDR) metadata comprising information establishing picture settings implementable by the media player to render the base layer media content according to an existing HDR profile;
    wherein the enhancement metadata authorization decision comprises:
        a decision to authorize enablement of the enhanced HDR metadata to allow playing of the base layer media content in conjunction with the enhanced HDR metadata; and
        a decision to authorize enablement of the enhanced HDR metadata associated with one or more other titles associated with one or more other media discs subsequently inserted into the media player.

2. The computer-implemented method of claim 1, wherein the title identifies the base layer media content stored on the media disc.

3. The computer-implemented method of claim 1, wherein the base layer media content comprises media content authored in accordance with a non-enhanced HDR media profile.

4. The computer-implemented method of claim 1, wherein the enhanced HDR metadata comprises metadata including one or more settings rendering the base layer media content in accordance with an enhanced HDR media profile.

5. The computer-implemented method of claim 1, further comprising storing the one or more other titles in a memory of the media player.

6. The computer-implemented method of claim 5, further comprising determining whether enablement of the enhanced HDR metadata associated with the one or more other titles is authorized by checking the memory of the media player, and responsive to the enhanced HDR data being unauthorized, transmitting another enhancement metadata authorization request to the authorization server.

7. A computer-implemented method, comprising:
    receiving an enhancement metadata authorization request;
    parsing the enhancement metadata authorization request and determining at least one of a disc title or media player identification data from the enhancement metadata authorization request;
    determining whether the at least one of the disc title or the media player identification data is authorized for playback of base layer media content in conjunction with enhanced high dynamic range (HDR) metadata stored on a media disc identified by the disc title, the metadata comprising information establishing picture settings implementable by a media player identified by the media player identification data to render the base layer media content according to an existing HDR profile;
    generating a response based on the determinating, wherein the response comprises an authorization to allow playing of the base layer media content in conjunction with the enhancement metadata; and
    transmitting the response to the media player from which the enhancement metadata authorization request was received;
    wherein the enhancement metadata authorization decision comprises: a decision to authorize enablement of the enhanced HDR metadata to allow playing of the base layer media content in conjunction with the enhanced HDR metadata; and a decision to authorize enablement of the enhanced HDR metadata associated with one or more other titles associated with one or more other media discs subsequently inserted into the media player.

8. The computer-implemented method of claim 7, wherein the disc title identifies the base layer media content stored on the media disc.

9. The computer-implemented method of claim 7, wherein the base layer media content is authored in accordance with a non-enhanced HDR media profile.

10. The computer-implemented method of claim 7, wherein the enhanced HDR metadata comprises metadata including one or more settings rendering the base layer media content in accordance with an enhanced HDR media profile.

11. The computer-implemented method of claim 7, wherein the response comprises an authorization for enablement of the enhanced HDR metadata associated with at least one of one or more other disc titles associated with one or more other media discs or one or more subsequent firmware versions associated with the media player.

12. The computer-implemented method of claim 7, further comprising determining whether enablement of the enhanced HDR metadata associated with the one or more other titles is authorized by checking a memory of the media player, and responsive to the enhanced HDR metadata being unauthorized, transmitting another enhancement metadata authorization request to the authorization server.

13. An apparatus, comprising:
    a processor; and
    a memory unit operatively connected to the processor, the memory unit including computer code configured to cause the processor to:
        determine at least one of a title of a media disc or media player identification data regarding a media player in which the media disc is inserted;
        generate an enhancement metadata authorization request including the at least one of the title or the media player identification data;
        transmit the enhancement metadata authorization request to an authorization server;
        receive a response including an enhancement metadata authorization decision; and
        play base layer media content in conjunction with enhanced high dynamic range (HDR) metadata comprising information establishing picture settings implementable by the media player and used during playback to render the base layer media content according to an existing HDR profile;
    wherein the enhancement metadata authorization decision comprises: a decision to authorize enablement of the enhanced HDR metadata to allow playing of the base layer media content in conjunction with the enhanced HDR metadata; and a decision to authorize enablement of the enhanced HDR metadata associated with one or more other titles associated with one or more other media discs subsequently inserted into the media player.

14. The apparatus of claim 13, wherein the base layer media content is authored in accordance with a non-enhanced HDR media profile.

15. The apparatus of claim 13, wherein the enhanced HDR metadata comprises metadata including one or more settings rendering the base layer media content in accordance with an enhanced HDR media profile.

* * * * *